(12) United States Patent
Jun

(10) Patent No.: US 11,316,960 B2
(45) Date of Patent: Apr. 26, 2022

(54) ELECTRONIC APPARATUS COMPRISING DISPLAY PANEL INCLUDING AT LEAST ONE HOLE

(71) Applicant: LG Display Co., Ltd., Seoul (KR)

(72) Inventor: Changhwa Jun, Paju-si (KR)

(73) Assignee: LG DISLAY CO., LTD., Seoul (KR)

( * ) Notice: Subject to any disclaimer, the term of this patent is extended or adjusted under 35 U.S.C. 154(b) by 0 days.

(21) Appl. No.: 17/137,874

(22) Filed: Dec. 30, 2020

(65) Prior Publication Data
US 2021/0200063 A1 Jul. 1, 2021

(30) Foreign Application Priority Data

Dec. 31, 2019 (KR) .......................... 10-2019-0180123

(51) Int. Cl.
*H04M 1/02* (2006.01)
*G03B 15/03* (2021.01)
*F21V 8/00* (2006.01)
*G02B 5/30* (2006.01)
*G02B 5/18* (2006.01)

(52) U.S. Cl.
CPC ........ *H04M 1/0264* (2013.01); *G02B 5/1842* (2013.01); *G02B 5/30* (2013.01); *G02B 6/0068* (2013.01); *G03B 15/03* (2013.01); *H04M 1/0266* (2013.01)

(58) Field of Classification Search
CPC .. G02B 5/1842; H04M 5/0264; H04M 5/0266
See application file for complete search history.

(56) References Cited

U.S. PATENT DOCUMENTS

| 2015/0260994 A1* | 9/2015 | Akutsu | G02B 27/0172 359/567 |
| 2017/0262026 A1* | 9/2017 | Jin | G01S 17/08 |
| 2018/0150674 A1* | 5/2018 | Ryu | G02B 6/0091 |

FOREIGN PATENT DOCUMENTS

| KR | 10-2019-0004330 A | 1/2019 |
| KR | 10-2019-0117415 A | 10/2019 |

* cited by examiner

*Primary Examiner* — Keith G. Delahoussaye
(74) *Attorney, Agent, or Firm* — Polsinelli PC

(57) ABSTRACT

An electronic apparatus comprises a display panel defined by a display area and a non-display area surrounding the display area, including at least one hole formed in the display area, an optical module arranged below the display panel and overlaps with the at least one hole, a light source module arranged at one side of the optical module, and an optical member arranged between the at least one hole and the light source module and partially overlaps with each of the at least one hole and the light source module, wherein the optical member emits a light source or image output from the light source module toward the at least one hole.

18 Claims, 8 Drawing Sheets

ELECTRONIC APPARATUS COMPRISING DISPLAY PANEL INCLUDING AT LEAST ONE HOLE

CROSS-REFERENCE TO RELATED APPLICATION

This application claims the benefit of the Korean Patent Application No. 10-2019-0180123 filed on Dec. 31, 2019, which is hereby incorporated by reference in its entirety.

BACKGROUND

Field of the Disclosure

The present disclosure relates to an electronic apparatus displaying an image.

Description of the Background

An electronic apparatus such as a television, a monitor, a notebook computer, a smart phone, a tablet computer, an electronic pad, a wearable device, a watch phone, a portable information device, a navigator, or a vehicle control display device includes a display panel that displays an image. Also, the electronic apparatus is generally provided with a hole for a camera module, an illumination sensor and a fingerprint sensor at one side of a display area.

Recently, an electronic apparatus in which a bezel area is minimized and a display surface is enlarged is required.

SUMMARY

Accordingly, the present disclosure is made in view of the above problems and to provide an electronic apparatus in which visibility of a hole provided in a display area of a display panel is minimized.

In addition, additional features of the present disclosure will be clearly understood by those skilled in the art from the following description of the present disclosure.

In accordance with an aspect of the present disclosure, the above and other features can be accomplished by the provision of an electronic apparatus comprising a display panel defined by a display area and a non-display area surrounding the display area, including at least one hole formed in the display area, an optical module arranged below the display panel and provided to partially overlap the hole, a light source module arranged at one side of the optical module, and an optical member arranged between the hole and the light source module and provided to partially overlap each of the hole and the light source module, wherein the optical member emits a light source or image output from the light source module toward the hole.

In the electronic apparatus according to one aspect of the present disclosure, visibility of a hole provided in a display panel is minimized, whereby a user's satisfaction may be improved.

Also, in the electronic apparatus according to one aspect of the present disclosure, a light source or image having high luminance or an improved color reproduction rate is output to a hole of a display panel, whereby a difference between the light source or image output to the hole of the display panel and an image displayed over the display panel may be minimized and uniformity may be enhanced to improve a user's satisfaction.

In addition to the effects of the present disclosure as mentioned above, additional advantages and features of the present disclosure will be clearly understood by those skilled in the art from the above description of the present disclosure.

BRIEF DESCRIPTION OF THE DRAWINGS

The above and other features and advantages of the present disclosure will be more clearly understood from the following detailed description taken in conjunction with the accompanying drawings, in which.

DETAILED DESCRIPTION DISCLOSURE

Figure 1:
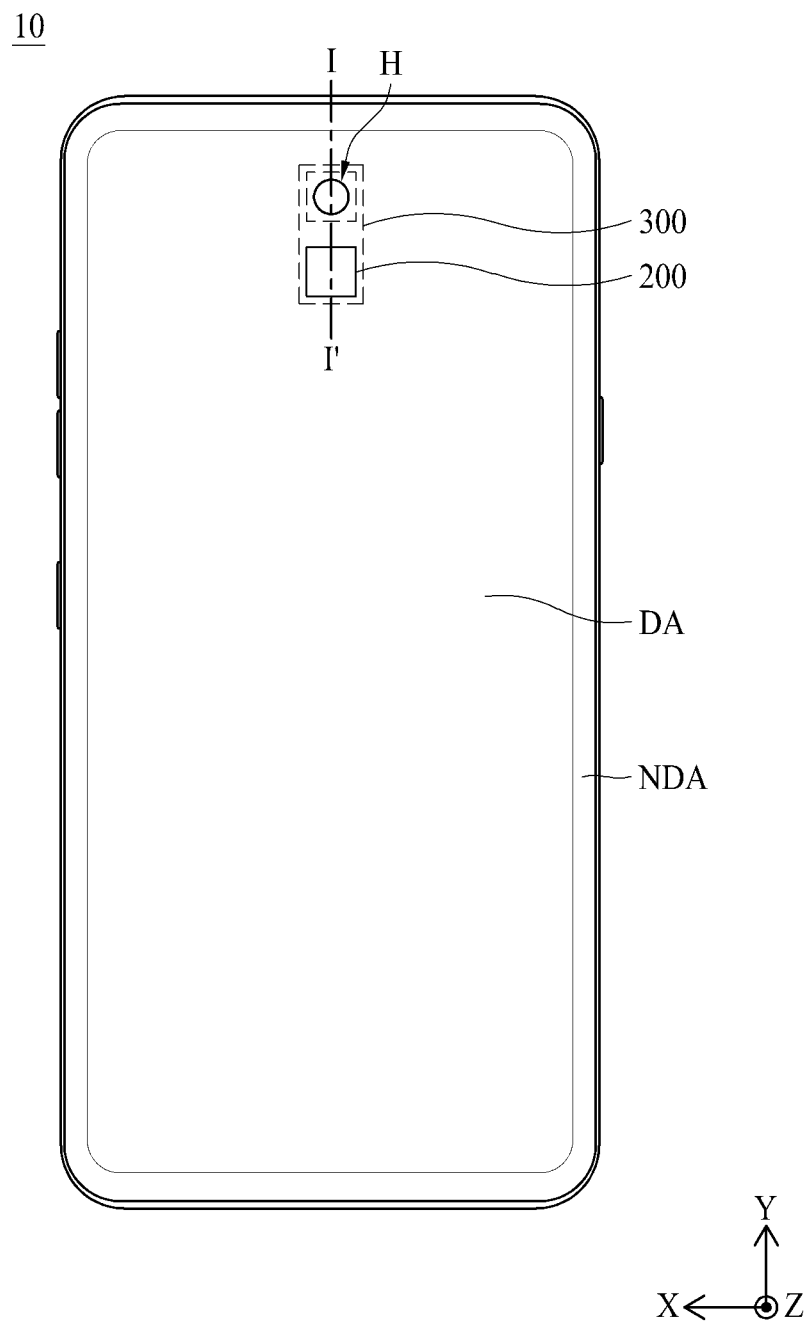
FIG. 1 is a plan view illustrating an electronic apparatus according to an aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

In describing a time relationship, for example, when the temporal order is described as 'after~,' 'subsequent~,' 'next~,' and 'before~,' a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, an electronic apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

Figure 2:
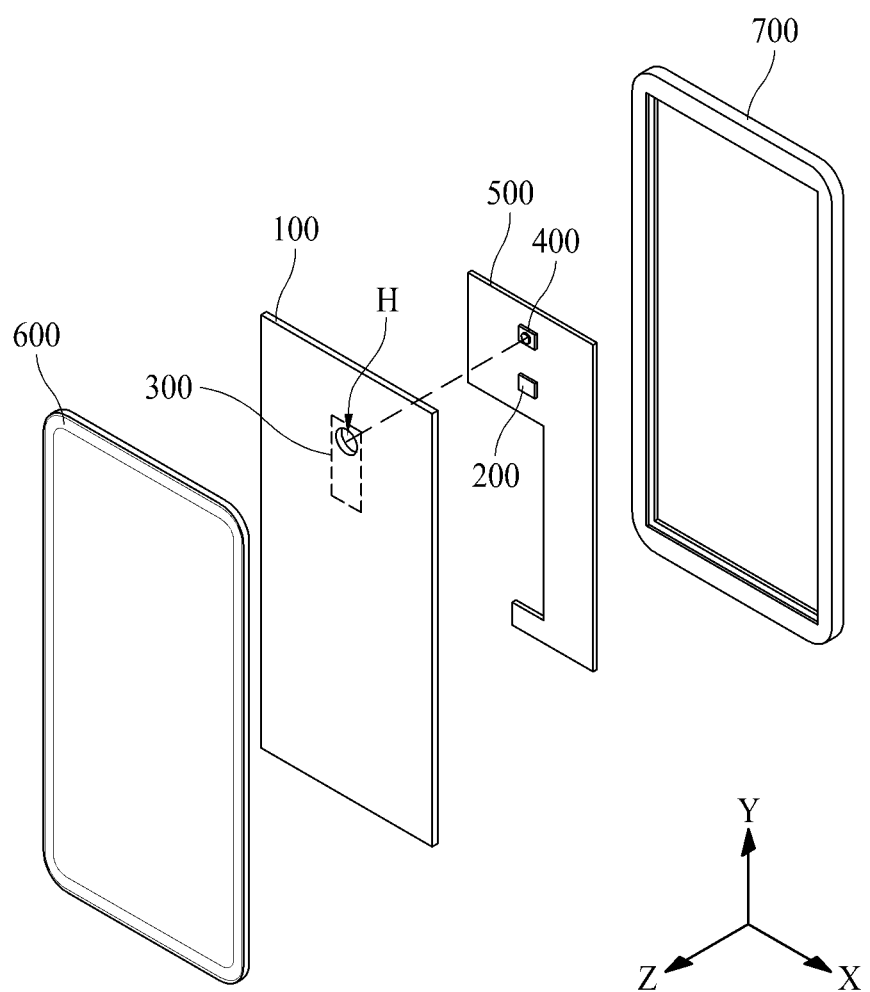
FIG. 2 is an exploded view illustrating an electronic apparatus according to an aspect of the present disclosure.
Figure 3:
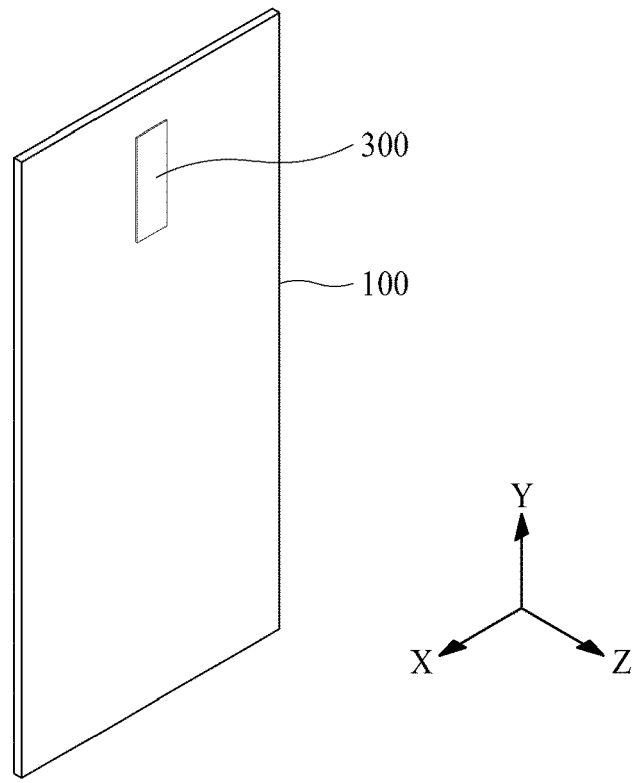
FIG. 3 is a rear perspective view illustrating a display panel according to an aspect of the present disclosure.
Figure 4:
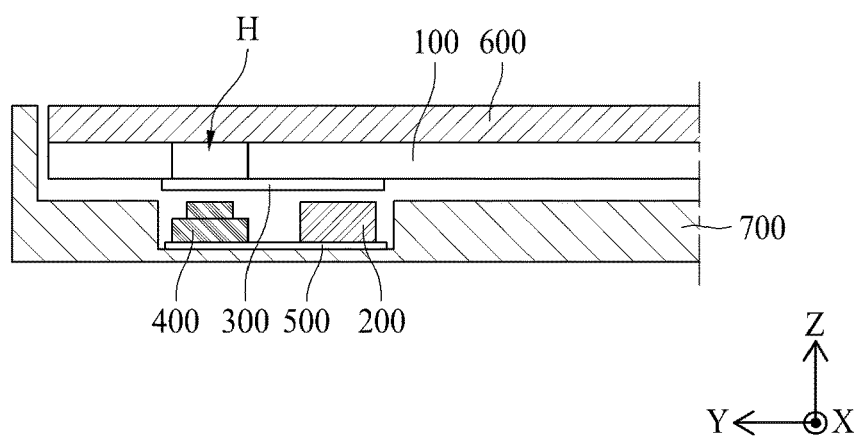
FIG. 4 is a cross-sectional view taken along line I-I' of FIG. 1.

FIG. 1 is a plane view illustrating an electronic apparatus according to one aspect of the present disclosure, FIG. 2 is an exploded view illustrating an electronic apparatus according to one aspect of the present disclosure, FIG. 3 is a rear perspective view illustrating a display panel according to one aspect of the present disclosure, and FIG. 4 is a cross-sectional view taken along line I-I' of FIG. 1.

Referring to FIGS. 1 to 4, the electronic apparatus 10 according to one aspect of the present disclosure may comprise a display panel 100, a hole H formed in the display panel 100, a light source module 200, an optical member 300, an optical module 400, a circuit board 500, a cover window 600, and a frame 700.

The display panel 100 may include display elements for outputting an image through a display surface. A display area DA and a non-display area NDA surrounding the display area DA may be defined in the display panel 100. The display area DA of the display panel 100 may be formed to overlap an area where a screen is seen in the electronic apparatus 10 of FIG. 1. The non-display area NDA of the display panel 100 may be defined as an area where a screen is not seen in the electronic apparatus 10 of FIG. 1. A driving element for driving the display area DA, a link line, etc. may be arranged in the non-display area NDA.

The display panel 100 according to one example may include an organic light emitting display panel and a liquid crystal display panel, and the aspect of the present disclosure is not limited to this example. A display panel used in the art may be used as the display panel 100 of the present disclosure. Also, the display panel 100 may include a display portion including a light emitting diode, a polarizing film arranged over one surface of the display portion, and a touch panel recognizing a user's touch, but the aspect of the present disclosure is not limited to this example.

The electronic apparatus 10 according to one aspect of the present disclosure may further comprise a display panel driver for driving the display panel 100. Also, the display panel driver may be controlled by a mobile application processor for controlling the electronic apparatus 10.

The hole H may be formed in at least a portion of the display panel, specifically an area overlapped with the display area DA of the display panel 100. The hole H formed in the display panel 100 may be formed to pass through one surface and the other surface of the display panel 100. In this case, one surface of the display panel 100 may be an upper surface of the display panel 100 or a display surface exposed to a user, and the other surface of the display panel 100 may be a rear surface of the display panel 100 facing one surface of the display panel 100. Although FIG. 1 shows that the hole H is provided at an upper end of the display panel 100, the aspect of the present disclosure is not limited to the example of FIG. 1. The hole H may be formed in various shapes such as a circular shape, an oval shape, a rectangular shape or an unfixed shape, and its dimension may be set without limitation. The shape or dimension of the hole H may be provided to correspond to a design of the light source module 200, the optical member 300 and the optical module 400, which will be described later.

The light source module 200 may be arranged at one side of the optical module 400. Also, the light source module 200 may be arranged below the display panel 100 and arranged not to overlap the hole H of the display panel 100. The optical module 400 may be arranged below the display panel 100, and may be arranged to partially overlap the hole H of the display panel 100. Therefore, the light source module 200 and the optical module 400 may be arranged below the display panel 100, the light source module 200 may be arranged to non-overlap the hole H, and the optical module 400 may be arranged to partially overlap the hole H. Therefore, the light source module 200 and the optical module 400 may be arranged to non-overlap each other below the display panel 100. Also, the light source module 200 may be provided to be packaged in the circuit board 500.

Also, the light source module 200 may output the light source or image for a first time period, and may operate so as not to output the light source or image for a second time period. The first time period may be a time period for displaying an image over the display panel 100. In detail, the first time period may be a time period where the display panel 100 and the light source module 200 operate and the optical module 400 does not operate. The second time period may be a time period for displaying an image over the display panel 100 and at the same time may be a time period where the optical module 400, which will be described later, operates. In detail, the second time period may be a time period where the display panel 100 and the optical module 400 operate and the light source module 200 does not operate. Therefore, the second time period may be a time period where the light source module 200 does not operate to minimize interference of the optical module 400 by means of the light source module 200.

Therefore, the light source module 200 may not operate for the second time period for operating the optical module 400, to minimize distortion of information collected through the hole H of the display panel 100.

According to one example, the light source module 200 may include, but is not limited to, at least one of a micro LED or micro display. The light source module 200 may be provided in the same manner as the display portion for displaying an image over the display panel 100. For example, if the display panel 100 is an OLED display panel, the light source module 200 may be an OLED light source module.

In this case, the micro LED may mean LED having a horizontal or vertical size of 100 μm or less. The micro LED may have a size of $1/10$ or less as compared with a general LED. The micro LED is known to have energy efficiency of about 20% or more as compared with the general LED, and has advantages of low heat emission and low power consumption due to a small size.

In this case, the micro display may mean a display of which screen has a diagonal length of 1 inch or less. The micro display may be a liquid crystal micro display or OLED micro display.

Also, the electronic apparatus 10 according to one aspect of the present disclosure may further comprise a light source module driver for controlling the operation of the light source module 200. Therefore, driving of the light source module 200 may be controlled through a separate light source module driver identified from the display panel driver but driving of the light source module 200 and driving of the display panel 100 may be controlled by a mobile application processor for controlling the electronic apparatus 10.

The optical member 300 may be provided to partially overlap the light source module 200 while overlapping the hole H. According to one example, the optical member 300 may be provided in the form of a film having a predetermined shape. In this case, the predetermined shape may mean a shape corresponding to the hole and the light source module 200 with which the optical member 300 is partially overlapped. For example, the optical member 300, as shown in FIG. 3, may be provided in the form of a rectangular shape having a predetermined thickness.

Also, the optical member 300 may be provided to be attached to a rear surface of the display panel 100 by an adhesive. Also, the optical member 300 may be provided to be spaced apart from the display panel 100 at a predetermined distance.

The optical member 300 may include a first portion 301 for allowing a light source from the light source module 200 to enter one surface, a second portion 302 for transferring the light source entering the first portion 301, and a third portion 303 for outputting the light source transferred from the second portion 302. The first portion 301, the second portion 302 and the third portion 303 will be described later with reference to FIG. 5.

The optical member 300 may be made of a transparent metal oxide. For example, the optical member 300 may include, but is not limited to, at least one of $SiO_2$ and $TiO_2$.

Also, the optical member 300 may be made of a transparent polymer material. For example, the optical member 300 may include, but is not limited to, any one material of resin, Polyethylene Terephthalate (PET), Polycarbonate (PC), Polyethylene (PE), Poly Vinyl Chloride (PC), Poly Propylene (PP), Poly Styrene (PS) and Polymethylmethacrylate (PMMA).

Also, the optical member 300 may include a first material having a first refractive index and a second material having a second refractive index different from the first refractive index, to embody total reflection if necessary.

The optical member 300 may be referred to as an optical waveguide or a 3D grating diffraction film.

The optical member 300 may partially be overlapped with the hole H and the light source module 200 while being arranged over a rear surface of the display panel 100. In detail, a portion of the optical member 300 may be arranged in the form of a film that covers the hole H, and the other portion of the optical member 300 may be provided to partially overlap the light source module 200.

The optical member 300 according to one aspect of the present disclosure may be a 3D grating diffraction film.

At this time, if a size of the optical module 200 is set to be greater than a size of the hole H, the first portion 301 of the optical member 300 may be set to have a size greater than the third portion 303 of the optical member. In this case, since the image or light source output from the light source module 200 having a wide area is output toward the hole H having a relatively small area, luminance of the image or light source observed in the hole H may be increased. Therefore, visibility of the hole of the display panel 100 may be minimized.

The optical module 400 may be provided to partially overlap the hole H formed in the display area DA of the display panel 100.

According to one example, the optical module 400 may mean all elements for performing a function using external light input through the hole H of the display panel 100. In detail, the optical module 400 may be a camera module, however, the aspect of the present disclosure is not limited to this example. The optical module may be an illumination sensor or a fingerprint sensor.

The circuit board 500 may be provided over the rear surface of the display panel 100 to overlap the light source module 200 and the optical module 400. The circuit board 500 may be a printed circuit board (PCB) or a flexible printed circuit board (FPCB). The circuit board 500 may include a connector connected to a cable connected to an application board of the electronic apparatus. In this case, the application board may be defined as a circuit board in which an application chip is packaged. The application board and the circuit board 500 may be designed in a single body in accordance with a design of the electronic apparatus. Driving of each of the light source module 200 and the optical module 400 packaged in the circuit board 500 may be controlled by an application processor.

Although FIGS. 2 and 4 show that the light source module 200 and the optical module 400 are packaged in the same circuit board 500, the aspect of the present disclosure is not limited to this example. For example, each of the light source module 200 and the optical module 400 may electrically be connected with a motherboard of the electronic apparatus 10 through a separate flexible circuit film.

Also, the electronic apparatus 10 according to one aspect of the present disclosure may further comprise a cover window 600 that covers the display panel 100.

The cover window 600 may serve to protect the display panel 100 from external impact by covering an entire surface of the display panel 100.

The cover window 600 according to one example may be made of a transparent plastic material, a glass material, or a reinforcing glass material. As an example, the cover window 600 may have one or a deposited structure of sapphire glass and gorilla glass. As another example, the cover window 600 may include any one of polyethylene terephthalate (PET), polycarbonate (PC), polyethersulfone (PES), polyethylenapthanate (PEN), and polynorborneen (PNB). The cover window 600 may be made of reinforcing glass in consideration of scratch and transparency.

The frame 700 may accommodate the display panel 100 and support the cover window 600. Also, the frame 700 may include an accommodating portion that may accommodate the light source module 200, the optical member 300, the optical module 400 and the circuit board 500. Therefore, the frame 700 may serve to fix the light source module 200, the optical member 300, the optical module 400 and the circuit board 500 to the electronic apparatus 10 and protect the light source module 200, the optical member 300, the optical module 400 and the circuit board 500 from impact.

In this case, the frame 700 may be a middle frame or a housing, but the aspect of the present disclosure is not limited to this example.

The light source module 200 of the electronic apparatus 10 according to one aspect of the present disclosure may operate to correspond to an image displayed over the display panel 100, and the light source or image output from the light source module 200 may be output to the hole H of the display panel 100 through the optical member 300. Also, the light source or image output to the hole H of the display panel 100 by the light source module 200 and the optical member 300 may correspond to the image displayed over the display panel 100. In detail, if the light source module 200 outputs an image corresponding to the image displayed over the display panel 100, images recognized by a user from the display panel 100 and the hole H of the display panel 100 may be driven to have uniformity. If the light source module 200 outputs a light source corresponding to the image displayed over the display panel 100, luminance of the light source recognized by a user from the hole H of the display panel 100 may be a luminance value corresponding to average luminance of the image displayed over the display panel 100 or average luminance of an adjacent portion of the hole H of the display panel 100, whereby visibility of the hole H of the display panel 100 may be reduced.

Therefore, even though the hole H communicated with one surface and the other surface of the display panel 100 is provided in the electronic apparatus 10 according to one aspect of the present disclosure, visibility of the hole H of the display panel 100 may be minimized by the light source or image provided by the light source module 200 and the optical member 300. Therefore, in the electronic apparatus 10 according to one aspect of the present disclosure, as visibility of the hole H provided in the display panel 100 is minimized, a user's satisfaction may be improved.

Also, for interaction between the image displayed over the display panel 100 and the light source or image provided by the light source module 200 and the optical member 300, each of the driver of the display panel 100 and the driver of the light source module 200 may be controlled by the mobile application processor.

Figure 5:
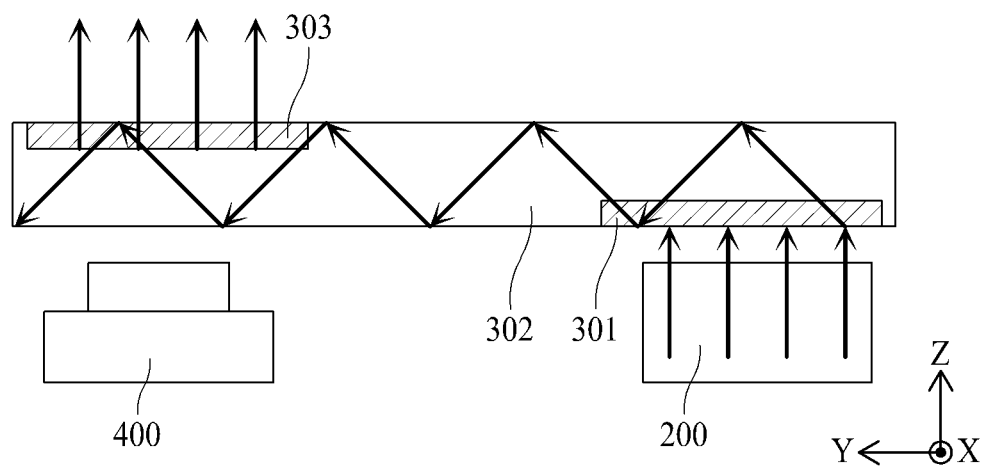
FIG. 5 is a detailed view illustrating that a light source or image output from a light source module of FIG. 4 is transferred to a hole of a display panel through an optical member.

FIG. 5 is a detailed view illustrating that a light source or image output from a light source module of FIG. 4 is transferred to a hole of a display panel through an optical member.

Referring to FIG. 5, the optical member 300 may include a first portion 301 for accommodating a light source or image output from the light source module 200, a second portion 302 for transmitting the light source or image accommodated in the first portion 301, and a third portion 303 for outputting the light source or image transmitted from the second portion 302 toward the hole H. At least a portion of the first portion 301 may be partially overlapped with the light source module 200, and at least a portion of the third portion 303 may be partially overlapped with the hole H of the display panel 100.

Although the optical member 300 is shown in FIG. 5 in the form of a rectangular film having a predetermined horizontal and vertical dimension and a predetermined thickness, the shape of the optical member 300 is not limited to this example. For example, the first portion 301 of the optical member 300, which will be described later, may be set to be greater than the size of the hole H, and may be set to a size corresponding to the optical module 200. The size of the third portion 303 may be different from that of the first portion 301. The third portion 303 may be set to be greater than the size of the hole H of the display panel 100. Therefore, one side of the second portion 302 may be set to correspond to the size of the first portion 301, and the other side of the second portion 302 may be set to correspond to the size of the third portion 303.

In this case, since the first portion 301 accommodates the light source from the light source module 200, the first portion 301 may be referred to as input grating.

The second portion 302 may serve to transfer the image or light source of the light source module, which is input to the first portion 301, to the third portion 303. Also, the second portion 302 may serve to convert a dimension of the image or light source of the light source module 200, which is input to the first portion 301, to a dimension corresponding to the hole H of the display panel 100. The second portion 302 may be referred to as intermediate grating.

Since the third portion 303 outputs the light source or image transferred from the second portion 302 through the hole H of the display panel 100, the third portion 303 may be referred to as output grating.

In the electronic apparatus 10 according to one aspect of the present disclosure, the process of transferring the image or light source output from the light source module 200 to the hole H of the display panel 100 through the optical member 300 may be described as follows.

First of all, the light source module 200 may be driven to output a predetermined image from the mobile application processor and the light source module driver. At this time, the light source or image output from the light source module 200 may correspond to an image corresponding to the image displayed over the display panel 100.

Next, the light source or image output from the light source module 200 is transferred to the first portion 301 of the optical member. A grating structure and a refractive index of the first portion 301 of the optical member may be set such that the light source or image output from the light source module 200 may have high in-coupling efficiency.

Next, the second portion 302 of the optical member may transfer the light source or image accommodated in the first portion 301 to the third portion 303 while minimizing a loss rate of the light source or image using total reflection. Also, the second portion 302 may enlarge or downsize the light source or image accommodated in the first portion 301 to correspond to the dimension of the hole H of the display panel 100.

Next, the third portion 303 may output the light source or image from the optical member 300 toward the hole H of the display panel 100. Also, a grating shape, a grating height or a grating cycle of the third portion 303 may be controlled to have uniform luminance or controlled luminance over the third portion 303.

Figure 6:
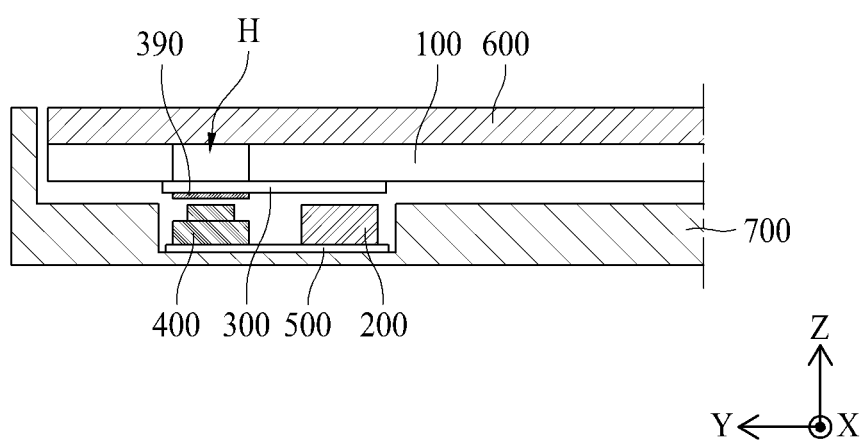
FIG. 6 is another cross-sectional view taken along line I-I' of FIG. 1.

FIG. 6 is another cross-sectional view taken along line I-I' of FIG. 1.

Referring to FIG. 6, the electronic apparatus 10 according to one aspect of the present disclosure may further comprise an auxiliary optical member 390 provided between the optical module 400 and the optical member 300. As described in FIG. 5, the optical member 300 may include an optical waveguide or a 3D grating diffraction film. For example, if the optical member 300 includes a 3D grating diffraction film, each of the first portion 301, the second portion 302 and the third portion 303 may include a 3D grating diffraction film that includes a regular diffraction pattern. Therefore, if an external light source enters through the hole H for a second time period, the external light source may generate diffraction while passing through the third portion 303 partially overlapped with the hole H, whereby this diffraction may act as a factor that disturbs the optical module 400 to collect external information through the hole H. In this way, the auxiliary optical member 390 may compensate for diffraction generated when the external light source entering through the hole H passes through the optical member 300.

Therefore, the auxiliary optical member 390 may compensate for diffraction generated by the optical member 300 for the second time period where the optical module 400 recognizes external light entering the hole H of the display panel 100.

The optical module 400 of the electronic apparatus 10 may mean all elements that perform a function using external light input through the hole H of the display panel 100. In detail, the optical module 400 may be a camera module. Also, the optical module may be an illumination sensor or a fingerprint sensor.

Therefore, if the optical module 400 performs a function using external light input through the hole H of the display panel 100, interference caused by the aforementioned optical member 300 may occur. In detail, diffraction of the external light may occur. The auxiliary optical member 390 may improve driving exactness of the optical module 400 by compensating for diffraction or interference of the external light, which is caused by the optical member 300.

Figure 7:
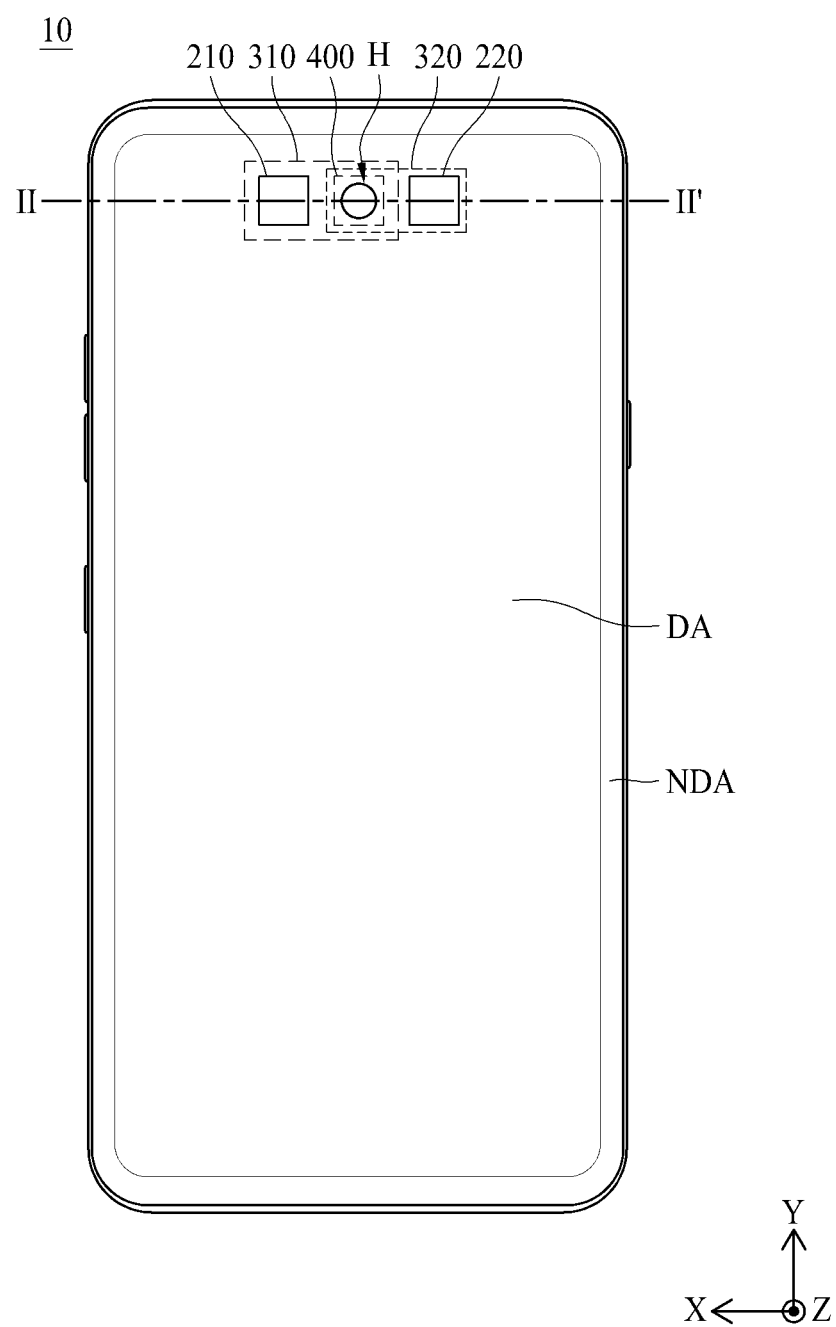
FIG. 7 is a plane view illustrating an electronic apparatus according to an aspect of the present disclosure.
Figure 8:
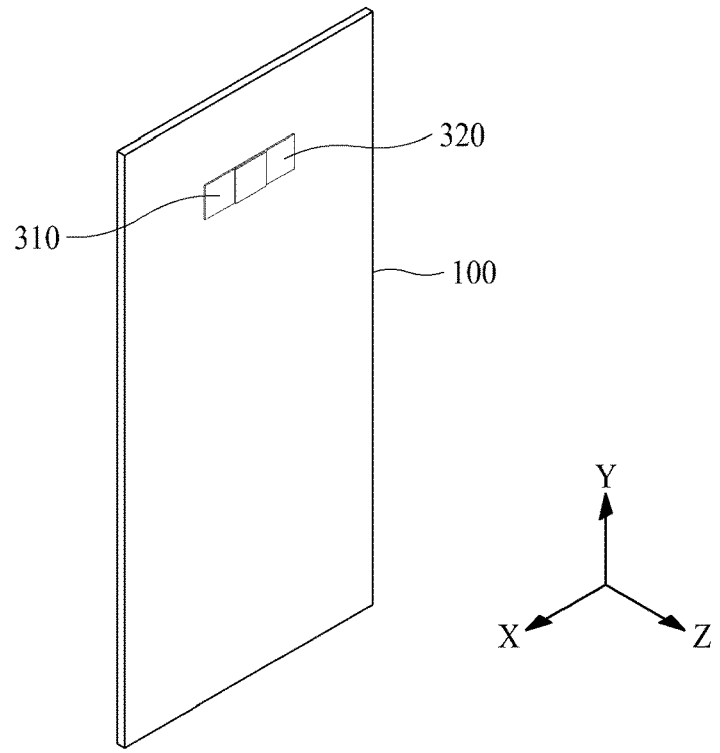
FIG. 8 is a rear perspective view illustrating a display panel according to an aspect of the present disclosure.
Figure 9:
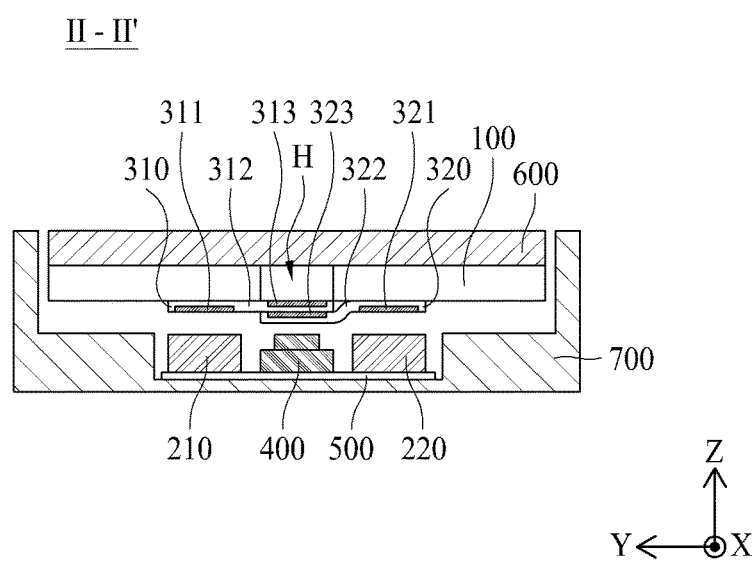
FIG. 9 is a cross-sectional view taken along line II-IF of FIG. 7.

FIG. 7 is a plane view illustrating an electronic apparatus according to one aspect of the present disclosure, FIG. 8 is a rear perspective view illustrating a display panel according to one aspect of the present disclosure, and FIG. 9 is a cross-sectional view taken along line II-IF of FIG. 7.

Referring to FIGS. 7 and 9, the electronic apparatus 10 according to one aspect of the present disclosure may comprise a display panel 100, a hole H formed in the display panel 100, a first light source module 210, a second light source module 220, a first optical member 310, a second optical member 320, an optical module 400, a circuit board 500, a cover window 600, and a frame 700. Since the display apparatus 10 according to one aspect of the present disclosure in FIGS. 7 to 9 is the same as the electronic apparatus 10 described in FIGS. 1 to 5 except for the first light source module 210, the second light source module 220, the first optical member 310 and the second optical member 320 and an arrangement relation for the hole H of the display panel 100 with the first light source module 210, the second light source module 220, the first optical member 310 and the second optical member 320, its repeated description will be omitted.

The operation of the first light source module 210 and the second light source module 220 may be controlled by the light source module driver. Therefore, although driving of the first light source module 210 and the second light source module 220 may be controlled through a separate light source module driver identified from the display panel driver, driving of the first light source module 210 and the second light source module 220 and driving of the display panel 100 may be controlled by the mobile application processor that controls the electronic apparatus 10.

The first light source module 210 and the second light source module 220 may be arranged to be spaced apart from each other below the display panel 100. The first light source module 210 and the second light source module 220 may be arranged to non-overlap the hole H of the display panel 100 and the optical module 400. In this case, the first light source module 210 and the second light source module 220 may be light source modules for outputting images of the same color, specifically may be a display module that may be driven separately. Also, the first light source module 210 and the second light source module 220 may be provided as the same elements as the display portion for displaying the image over the display panel 100.

At this time, the images output to the hole H of the display panel 100 by the first light source module 210 and the second light source module 220 and the first optical member 310 and the second optical member 320 may correspond to the image displayed over the display panel 100. In this case, the images corresponding to the image displayed over the display panel 100 may mean that the image displayed over the display panel 100 and the image displayed over the hole H may be viewed by a user without a difference.

Resolution of the image displayed by the first light source module 210 and the second light source module 220 may be controlled to correspond to resolution of the display panel 100. For example, if the first light source module 210 and the second light source module 220 are set to be greater than the size of the hole H, the image displayed by the first light source module 210 and the second light source module 220 may be output by being downsized through the optical member 300, whereby resolution of the first light source module 210 and the second light source module 220 may be set to be smaller than or equal to resolution of the display panel 100.

If the first light source module 210 and the second light source module 220 are set to be smaller than the size of the hole H, the image displayed by the first light source module 210 and the second light source module 220 may be output by being enlarged through the optical member 300, whereby resolution of the first light source module 210 and the second light source module 220 may be set to be greater than resolution of the display panel 100. In this case, resolution may mean pixel per inch (ppi), and it may be understood that high resolution has a high pixel per inch value.

Also, although FIGS. 7 to 9 show that the first light source module 210 and the second light source module 220 are arranged at a straight line, the aspect of the present disclosure is not limited to the example of FIGS. 7 to 9. The first light source module 210 and the second light source module 220 may be arranged without limitation in accordance with a design of the electronic apparatus 10.

The first optical member 310 may be provided to partially overlap the first light source module 210 and the hole H. In detail, the first optical member 310 may include a first portion 311, a second portion 312 and a third portion 313.

The first portion 311 may be partially overlapped with the first light source module 210. The third portion 313 may be partially overlapped with the hole H and the optical module 400. The second portion 312 may be provided to communicate the first portion 311 with the third portion 313.

Also, the third portion 313 may be partially overlapped with a third portion 323 of the second optical member 320, which will be described later.

Since the first portion 311, the second portion 312 and the third portion 313 perform the same functions as the first portion 301, the second portion 302 and the third portion 303, which are described in FIG. 5, their description will be omitted.

The second optical member 320 may be provided to partially overlap the second light source module 220 and the hole H. In detail, the second optical member 320 may include a first portion 321, a second portion 322 and a third portion 323.

The first portion 321 may be partially overlapped with the second light source module 220. The third portion 323 may be partially overlapped with the hole H and the optical module 400. The second portion 322 may be provided to communicate the first portion 321 with the third portion 323.

Also, the third portion 323 may be partially overlapped with the third portion 313 of the first optical member 310.

Since the first portion 321, the second portion 322 and the third portion 323 perform the same functions as the first portion 301, the second portion 302 and the third portion 303, which are described in FIG. 5, their description will be omitted.

Although FIG. 9 shows that the first light source module 210, the second light source module 220 and the optical module 400 are packaged in the same circuit board 500, the aspect of the present disclosure is not limited to this example. For example, each of the first light source module 210, the second light source module 220 and the optical module 400 may electrically be connected with a motherboard of the electronic apparatus 10 through a separate flexible circuit film.

In the electronic apparatus 10 according to one aspect of the present disclosure, the first light source module 210 and the second light source module 220 may output images corresponding to the image displayed over the display panel 100, and the light sources output from the light source module 200 may respectively be output to the hole H of the display panel 100 through the first optical member 310 and the second optical member 320. Also, the first light source module 210 and the second light source module 220 may be controlled to output images of the same color.

Also, the images output to the hole H of the display panel 100 by the first light source module 210, the second light source module 220, the first optical member 310 and the second optical member 320 may correspond to the image displayed over the display panel 100. In detail, images recognized by a user from the display panel 100 and the hole H of the display panel 100 may be driven to have uniformity.

Therefore, even though the hole H communicated with one surface and the other surface of the display panel 100 is provided in the electronic apparatus 10 according to one aspect of the present disclosure, visibility of the hole H of the display panel 100 may be lowered by the image provided by the first light source module 210, the second light source module 220, the first optical member 310 and the second optical member 320. Therefore, in the electronic apparatus 10 according to one aspect of the present disclosure, as visibility of the hole H provided in the display panel 100 is minimized, a user's satisfaction may be improved.

Also, for interaction between the image displayed over the display panel 100 and the image provided by the first light source module 210, the second light source module 220, the first optical member 310 and the second optical member 320, each of the driver of the display panel 100, the driver of the first light source module 210 and the driver of the second light source module 220 may be controlled by the mobile application processor.

Also, the first light source module 210 and the second light source module 220 of the electronic apparatus 10 according to one aspect of the present disclosure may output the same image, and the images output to the hole H of the display panel 100 through the first optical member 310 and the second optical member 320 may have luminance more improved than the image output through a single light source module. Therefore, in the electronic apparatus 10 according to one aspect of the present disclosure, the image of high luminance may be output to the hole H of the display panel 100, whereby a difference between the image displayed over the hole H of the display panel 100 and the image displayed over the display panel 100 may be minimized and uniformity may be enhanced to improve a user's satisfaction.

In FIGS. 7 to 9, the process of displaying the images output from the first light source module 210 and the second light source module 220 over the hole H of the display panel 100 may be described as follows.

First of all, the first light source module 210 and the second light source module 220 may be driven to output a predetermined image from the mobile application processor and the light source module driver. At this time, the light source or image output from the first light source module 210 and the second light source module 220 may correspond to an image corresponding to the image displayed over the display panel 100.

Next, the images output from each of the first light source module 210 and the second light source module 220 are transferred to the first portion 311 of the first optical member 310 and the first portion 321 of the second optical member 320. A grating structure and a refractive index of each of the first portion 311 of the first optical member 310 and the first portion 321 of the second optical member 320 may be set such that the images output from the first light source module 210 and the second light source module 220 may have high in-coupling efficiency.

Next, the second portion 312 of the first optical member 310 and the second portion 322 of the second optical member 320 may transfer the image accommodated in each of the first portion 311 of the first optical member 310 and the first portion 321 of the second optical member 320 to the third portion 313 of the first optical member 310 and the third portion 323 of the second optical member 320 while minimizing a loss rate of the image using total reflection. Also, the second portion 312 of the first optical member 310 and the second portion 322 of the second optical member 320 may enlarge or downsize the image accommodated in each of the first portion 311 of the first optical member 310 and the first portion 321 of the second optical member 320 to correspond to the dimension of the hole H of the display panel 100.

Next, the third portion 313 of the first optical member 310 and the third portion 323 of the second optical member 320 may output the image from each of the first optical member 310 and the second optical member 320 toward the hole H of the display panel 100. Also, a grating shape, a grating height or a grating cycle of the third portion 303 may be controlled to have uniform luminance or controlled luminance over the third portion 313 of the first optical member 310 and the third portion 323 of the second optical member 320.

Figure 10:
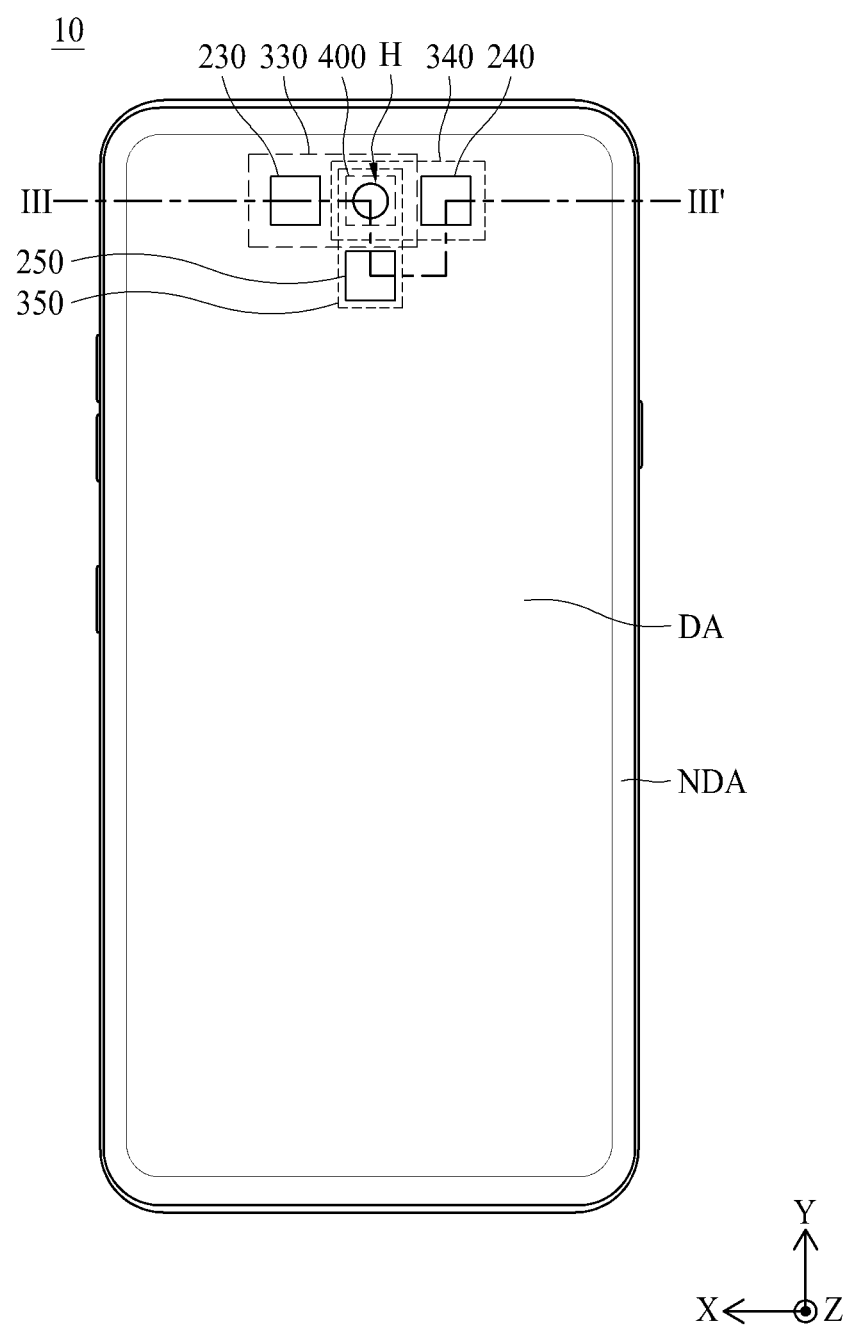
FIG. 10 is a plane view illustrating an electronic apparatus according to an aspect of the present disclosure.
Figure 11:
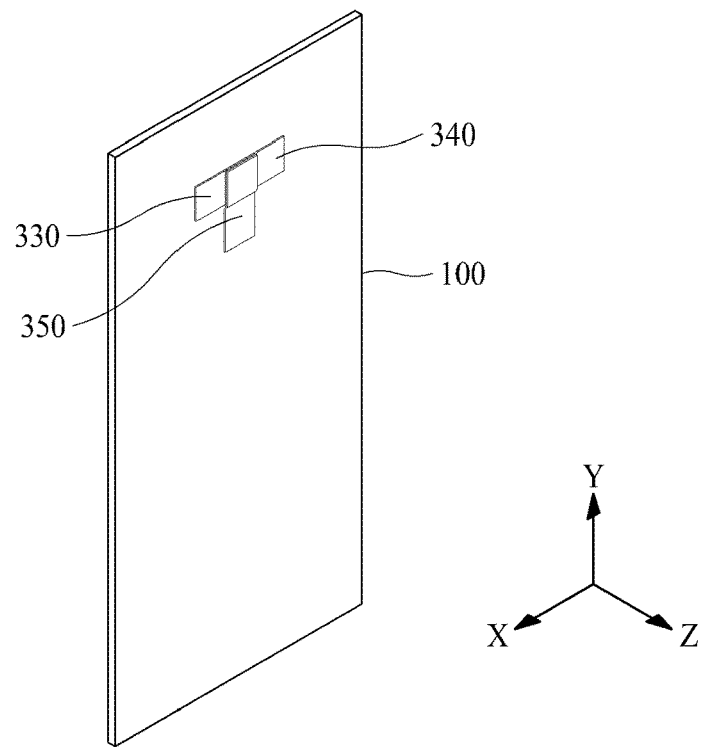
FIG. 11 is a rear perspective view illustrating a display panel according to an aspect of the present disclosure.
Figure 12:
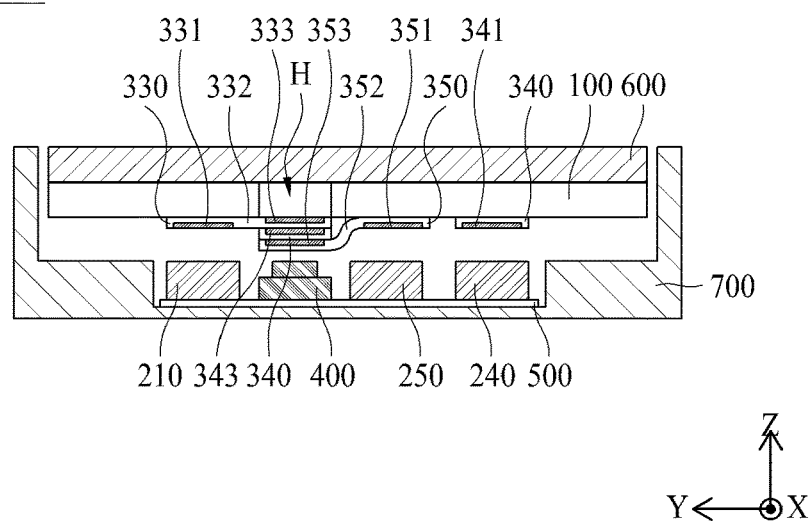
FIG. 12 is a cross-sectional view taken along line of FIG. 10.

FIG. 10 is a plane view illustrating an electronic apparatus according to one aspect of the present disclosure, FIG. 11 is a rear perspective view illustrating a display panel according to one aspect of the present disclosure, and FIG. 12 is a cross-sectional view taken along line of FIG. 10.

Referring to FIGS. 10 to 12, the electronic apparatus 10 according to one aspect of the present disclosure may comprise a display panel 100, a hole H formed in the display panel 100, a first light source module 230, a second light source module 240, a third light source module 250, a first optical member 330, a second optical member 340, a third optical member 350, an optical module 400, a circuit board 500, a cover window 600, and a frame 700. Since the display apparatus 10 according to one aspect of the present disclosure in FIGS. 10 to 12 is the same as the electronic apparatus 10 described in FIGS. 1 to 5 except for the first light source module 230, the second light source module 240, the third light source module 250, the first optical member 330, the second optical member 340, the third optical member 350 and an arrangement relation for the hole H of the display panel 100 with the first light source module 230, the second light source module 240, the third light source module 250, the first optical member 330, the second optical member 340 and the third optical member 350, its repeated description will be omitted.

The operation of the first light source module 230, the second light source module 240 and the third light source module 250 may be controlled by the light source module driver. Therefore, although driving of the first light source module 230, the second light source module 240 and the third light source module 250 may be controlled through a separate light source module driver identified from the display panel driver, driving of the first light source module 230, the second light source module 240 and the third light source module 250 and driving of the display panel 100 may be controlled by the mobile application processor that controls the electronic apparatus 10.

The first light source module 230, the second light source module 240 and the third light source module 250 may be arranged to be spaced apart from one another below the display panel 100. The first light source module 230, the second light source module 240 and the third light source module 250 may be arranged not to overlap the hole H of the display panel 100 and the optical module 400. In this case, the first light source module 230, the second light source module 240 and the third light source module 250 may be light source modules for outputting at least one light source of red, green and blue light sources, or may be micro LEDs.

At this time, the images output to the hole H of the display panel 100 by the first light source module 230, the second light source module 240, the third light source module 250, the first optical member 330, the second optical member 340 and the third optical member 350 may output the light source corresponding to the image displayed over the display panel 100. In this case, the light source corresponding to the image displayed over the display panel 100 may mean that the image displayed over the display panel 100 and the image displayed over the hole H may be viewed by a user without a difference.

Although FIG. 12 shows that the first light source module 230, the second light source module 240, the third light source module 250 and the optical module 400 are packaged in the same circuit board 500, the aspect of the present disclosure is not limited to this example.

The first optical member 330 may be provided to partially overlap each of the first light source module 230 and the hole H. In detail, the first optical member 330 may include a first portion 331, a second portion 332, and a third portion 333.

The first portion 331 may be partially overlapped with the first light source module 230. The third portion 333 may be partially overlapped with the hole H and the optical module 400. The second portion 332 may be provided to communicate the first portion 331 with the third portion 333.

Also, the third portion 333 may be partially overlapped with a third portion 343 of the second optical member 340 and a third portion 353 of the third optical member 350, which will be described later.

Since the first portion 331, the second portion 332 and the third portion 333 perform the same functions as the first portion 301, the second portion 302 and the third portion 303, which are described in FIG. 5, their description will be omitted.

The second optical member 340 may be provided to partially overlap each of the second light source module 240 and the hole H. In detail, the second optical member 340 may include a first portion 341, a second portion 342, and a third portion 343.

The first portion 341 may be partially overlapped with the second light source module 240. The third portion 343 may be partially overlapped with the hole H and the optical module 400. The second portion 342 may be provided to communicate the first portion 341 with the third portion 343.

Also, the third portion 343 of the second optical member 340 may be partially overlapped with the third portion 353 of the third optical member 350, which will be described later, while being partially overlapped with the third portion 333 of the first optical member 330.

Since the first portion 341, the second portion 342 and the third portion 343 perform the same functions as the first portion 301, the second portion 302 and the third portion 303, which are described in FIG. 5, their description will be omitted.

The third optical member 350 may be provided to partially overlap each of the third light source module 250 and the hole H. In detail, the third optical member 350 may include a first portion 351, a second portion 352, and a third portion 353.

The first portion 351 may be partially overlapped with the third light source module 250. The third portion 353 may be partially overlapped with the hole H and the optical module 400. The second portion 352 may be provided to communicate the first portion 351 with the third portion 353.

Also, the third portion 353 of the third optical member 350 may be partially overlapped with the third portion 333 of the first optical member 330 and the third portion 343 of the second optical member 340.

Since the first portion 351, the second portion 352 and the third portion 353 perform the same functions as the first portion 301, the second portion 302 and the third portion 303, which are described in FIG. 5, their description will be omitted.

In the electronic apparatus 10 according to one aspect of the present disclosure, the first light source module 230, the second light source module 240 and the third light source module 250 may output light sources corresponding to the image displayed over the display panel 100, and the light sources output from the first light source module 230, the second light source module 240 and the third light source module 250 may respectively be output to the hole H of the display panel 100 through the first optical member 330, the second optical member 340 and the third optical member 350. If the first light source module 230, the second light source module 240 and the third light source module 250 output light sources corresponding to the image displayed over the display panel 100, luminance of the light source recognized by the user from the hole H of the display panel 100 may be a luminance value corresponding to average luminance of the image displayed over the display panel 100 or average luminance of a portion adjacent to the hole H of the display panel 100, whereby visibility of the hole H of the display panel 100 may be reduced.

Also, the images output to the hole H of the display panel 100 by the first light source module 230, the second light source module 240, the third light source module 250, the first optical member 330, the second optical member 340 and the third optical member 350 may correspond to the image displayed over the display panel 100. In detail, a difference between images recognized by a user from the display panel 100 and the hole H of the display panel 100 may be minimized.

Therefore, even though the hole H communicated with one surface and the other surface of the display panel 100 is provided in the electronic apparatus 10 according to one aspect of the present disclosure, visibility of the hole H of the display panel 100 may be lowered by the light sources provided by the first light source module 230, the second light source module 240, the third light source module 250, the first optical member 330, the second optical member 340 and the third optical member 350. Therefore, in the electronic apparatus 10 according to one aspect of the present disclosure, as visibility of the hole H provided in the display panel 100 is minimized, a user's satisfaction may be improved.

Also, for interaction between the image displayed over the display panel 100 and the images provided by the first light source module 230, the second light source module 240, the third light source module 250, the first optical member 330, the second optical member 340 and the third optical member 350, each of the driver of the display panel 100 and each of the drivers for controlling the first light source module 230, the second light source module 240 and the third light source module 250 may be controlled by the mobile application processor.

Also, the first light source module 230, the second light source module 240 and the third light source module 250 of the electronic apparatus 10 according to one aspect of the present disclosure may be light source modules that output at least one light source of red, green and blue light sources, or may be micro LEDs.

In detail, the first light source module 230 may be a light source module for outputting a red light source, the second light source module 240 may be a light source module for outputting a green light source, and the third light source module 250 may be a light source module for outputting a blue light source. The electronic apparatus 10 according to one aspect of the present disclosure may output light sources of which red, green and blue light sources are controlled, to the hole H of the display panel 100 through the first optical member 330, the second optical member 340 and the third optical member 350.

Therefore, the light sources output to the hole H of the display panel 100 through the first light source module 230, the second light source module 240, the third light source module 250, the first optical member 330, the second optical member 340 and the third optical member 350 may have luminance more improved than the image output through a single light source module and output an improved color reproduction rate. Therefore, in the electronic apparatus 10 according to one aspect of the present disclosure, the image of high luminance and an improved color reproduction rate may be output to the hole H of the display panel 100, whereby a difference between the image displayed over the hole H of the display panel 100 and the image displayed over the display panel 100 may be minimized and uniformity may be enhanced to improve a user's satisfaction.

If the electronic apparatus 10 according to one aspect of the present disclosure comprises the first light source module 230, the second light source module 240, the third light source module 250, the first optical member 330, the second optical member 340 and the third optical member 350, luminance may be more improved than the electronic apparatus comprising a single light source module and a single optical member. Also, if the electronic apparatus 10 according to one aspect of the present disclosure comprises the first light source module 230, the second light source module 240, the third light source module 250, the first optical member 330, the second optical member 340 and the third optical member 350, red, green and blue light sources may be driven independently, and a blue light source module may additionally be arranged for optimization of a lifetime of the first light source module 230, the second light source module 240 and the third light source module 250, whereby the light source output to the hole H of the display panel 100 may be optimized.

In FIGS. 10 to 12, the process of displaying the light sources output from the first light source module 230, the second light source module 240 and the third light source module 250 over the hole H of the display panel 100 may be described as follows.

First of all, the first light source module 230, the second light source module 240 and the third light source module 250 may be driven to output a predetermined light source from the mobile application processor and the light source module driver. At this time, the light sources output from the first light source module 230, the second light source module 240 and the third light source module 250 may be controlled to have luminance and color coordinates corresponding to the image displayed over the display panel 100.

Next, the light sources output from the first light source module 230, the second light source module 240 and the third light source module 250 are respectively transferred to the first portion 331 of the first optical member 330, the first portion 341 of the second optical member 340 and the first portion 351 of the third optical member 350. A grating structure and a refractive index of each of the first portion 331 of the first optical member 330, the first portion 341 of the second optical member 340 and the first portion 351 of the third optical member 350 may be set such that the images output from the first light source module 230, the second light source module 240 and the third light source module 250 may have high in-coupling efficiency.

Next, the second portion 332 of the first optical member 330, the second portion 342 of the second optical member 340 and the second portion 352 of the third optical member 350 may transfer the image accommodated in each of the first portion 331 of the first optical member 330, the first portion 341 of the second optical member 340 and the first portion 351 of the third optical member 350 to the third portion 333 of the first optical member 330, the third portion 343 of the second optical member 340 and the third portion 353 of the third optical member 350 while minimizing a loss rate of the image using total reflection. Also, the second portion 332 of the first optical member 330, the second portion 342 of the second optical member 340 and the second portion 352 of the third optical member 350 may enlarge or downsize the image accommodated in each of the first portion 331 of the first optical member 330, the first portion 341 of the second optical member 340 and the first portion 351 of the third optical member 350 to correspond to the dimension of the hole H of the display panel 100.

Next, the third portion 333 of the first optical member 330, the third portion 343 of the second optical member 340 and the third portion 353 of the third optical member 350 may output the light sources from the first optical member 330, the second optical member 340 and the third optical member 350 toward the hole H of the display panel 100. Also, a grating shape, a grating height or a grating cycle of each of the third portion 333 of the first optical member 330, the third portion 343 of the second optical member 340 and the third portion 353 of the third optical member 350 may be controlled to have uniform luminance or controlled luminance over the third portion 333 of the first optical member 330, the third portion 343 of the second optical member 340 and the third portion 353 of the third optical member 350.

The electronic apparatus according to one aspect of the present disclosure may be described as follows.

The electronic apparatus according to one aspect of the present disclosure comprises a display panel defined by a display area and a non-display area surrounding the display area, including at least one hole formed in the display area, an optical module arranged below the display panel and provided to partially overlap the hole, a light source module arranged at one side of the optical module, and an optical member arranged between the hole and the light source module and provided to partially overlap each of the hole and the light source module, wherein the optical member emits a light source or image output from the light source module toward the hole.

According to some aspects of the present disclosure, the optical member may include a first portion partially overlapped with the light source module, a third portion partially overlapped with the hole, and a second portion communicating the first portion with the third portion.

According to some aspects of the present disclosure, the optical member may include at least one of an optical waveguide and a grating diffraction film.

According to some aspects of the present disclosure, the light source module may output an image corresponding to the image displayed over the display panel.

According to some aspects of the present disclosure, the light source module may include a first light source module outputting a first image, and a second light source module outputting a second image, wherein the first image may be an image of the same color as that of the second image.

According to some aspects of the present disclosure, the optical member may include a first optical member partially overlapped with the first light source module and the hole, and a second optical member partially overlapped with the second light source module and the hole.

According to some aspects of the present disclosure, the first optical member may include a first portion partially overlapped with the first light source module, a third portion partially overlapped with the hole, and a second portion communicating the first portion of the first optical member with the third portion of the first optical member.

According to some aspects of the present disclosure, the second optical member may include a first portion partially overlapped with the second light source module, a third portion partially overlapped with the hole, and a second portion communicating the first portion of the second optical member with the third portion of the second optical member.

According to some aspects of the present disclosure, the third portion of the first optical member may be partially overlapped with the third portion of the second optical member.

According to some aspects of the present disclosure, the light source module may include a first light source module outputting a red light source, a second light source module outputting a green light source, and a third light source module outputting a blue light source.

According to some aspects of the present disclosure, the optical member may include a first optical member partially overlapped with the first light source module and the hole, a second optical member partially overlapped with the second light source module and the hole, and a third optical member partially overlapped with the third light source module and the hole.

According to some aspects of the present disclosure, the first optical member may include a first portion partially overlapped with the first light source module, a third portion partially overlapped with the hole, and a second portion communicating the first portion of the first optical member with the third portion of the first optical member.

According to some aspects of the present disclosure, the second optical member may include a first portion partially overlapped with the second light source module, a third portion partially overlapped with the hole, and a second portion communicating the first portion of the second optical member with the third portion of the second optical member.

According to some aspects of the present disclosure, the third optical member may include a first portion partially overlapped with the third light source module, a third portion partially overlapped with the hole, and a second portion communicating the first portion of the third optical member with the third portion of the third optical member.

According to some aspects of the present disclosure, the third portion of the first optical member, the third portion of the second optical member and the third portion of the third optical member may be partially overlapped with one another.

According to some aspects of the present disclosure, the electronic apparatus may further comprise an auxiliary optical member provided between the optical module and the optical member, wherein the auxiliary optical member may compensate for diffraction generated by external light entering the hole.

According to some aspects of the present disclosure, the light source module may output a light source or image for a first time period, and does not operate for a second time period different from the first time period.

According to some aspects of the present disclosure, the optical module may not operate for the first time period, and may collect external light source information through the hole for the second time period.

It will be apparent to those skilled in the art that the present disclosure described above is not limited by the above-described aspects and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

These and other changes can be made to the aspects in light of the above-detailed description. In general, in the following claims, the terms used should not be construed to limit the claims to the specific aspects disclosed in the specification and the claims, but should be construed to include all possible aspects along with the full scope of equivalents to which such claims are entitled. Accordingly, the claims are not limited by the disclosure.

What is claimed is:
1. An electronic apparatus comprising:
 a display panel configured to display pictures, wherein the display panel defined by a display area and a non- display area surrounding the display area, and the display panel including at least one hole disposed in the display area;
an optical module arranged below the display panel and partially overlapping with the at least one hole;
a light source module arranged below the display panel and arranged at one side of the optical module; and
an optical member arranged between the at least one hole and the light source module and partially overlapping with each of the at least one hole and the light source module,
wherein the optical member emits a light source or image output from the light source module toward the at least one hole.

2. The electronic apparatus of claim 1, wherein the optical member includes:
a first portion partially overlapping with the light source module;
a third portion partially overlapping with the at least one hole; and
a second portion communicating the first portion with the third portion.

3. The electronic apparatus of claim 1, wherein the optical member includes at least one of an optical waveguide and a grating diffraction film.

4. The electronic apparatus of claim 1, wherein the light source module outputs an image corresponding to the image displayed over the display panel.

5. The electronic apparatus of claim 1, wherein the light source module includes:
a first light source module outputting a first image; and
a second light source module outputting a second image, wherein the first image is an image of a same color as the second image.

6. The electronic apparatus of claim 5, wherein the optical member includes:
a first optical member partially overlapping with the first light source module and the at least one hole; and
a second optical member partially overlapping with the second light source module and the at least one hole.

7. The electronic apparatus of claim 6, wherein the first optical member includes:
a first portion partially overlapping with the first light source module;
a third portion partially overlapping with the at least one hole; and
a second portion communicating the first portion of the first optical member with the third portion of the first optical member.

8. The electronic apparatus of claim 6, wherein the second optical member includes:
a first portion partially overlapping with the second light source module;
a third portion partially overlapping with the at least one hole; and
a second portion communicating the first portion of the second optical member with the third portion of the second optical member.

9. The electronic apparatus of claim 8, wherein the third portion of the first optical member partially overlaps with the third portion of the second optical member.

10. The electronic apparatus of claim 1, wherein the light source module includes:

a first light source module outputting a red light source;
a second light source module outputting a green light source; and
a third light source module outputting a blue light source.

11. The electronic apparatus of claim 10, wherein the optical member includes:
a first optical member partially overlapping with the first light source module and the at least one hole;
a second optical member partially overlapping with the second light source module and the at least one hole; and
a third optical member partially overlapping with the third light source module and the at least one hole.

12. The electronic apparatus of claim 11, wherein the first optical member includes:
a first portion partially overlapping with the first light source module;
a third portion partially overlapping with the at least one hole; and
a second portion communicating the first portion of the first optical member with the third portion of the first optical member.

13. The electronic apparatus of claim 12, wherein the second optical member includes:
a first portion partially overlapping with the second light source module;
a third portion partially overlapping with the at least one hole; and
a second portion communicating the first portion of the second optical member with the third portion of the second optical member.

14. The electronic apparatus of claim 13, wherein the third optical member includes:
a first portion partially overlapping with the third light source module;
a third portion partially overlapping with the at least one hole; and
a second portion communicating the first portion of the third optical member with the third portion of the third optical member.

15. The electronic apparatus of claim 14, wherein the third portion of the first optical member, the third portion of the second optical member and the third portion of the third optical member partially overlap with one another.

16. The electronic apparatus of claim 1, further comprising an auxiliary optical member provided between the optical module and the optical member, wherein the auxiliary optical member compensates for diffraction generated by external light entering the at least one hole.

17. The electronic apparatus of claim 1, wherein the light source module outputs a light source or image for a first time period, and does not operate for a second time period different from the first time period.

18. The electronic apparatus of claim 17, wherein the optical module does not operate for the first time period, and collects external light source information through the at least one hole for the second time period.

* * * * *